United States Patent

Nordal

[15] 3,681,433
[45] Aug. 1, 1972

[54] PROCESS FOR THE PREPARATION OF ACYLAMIDE-2,4,6-TRIIODOBENZOIC

[72] Inventor: Vegard Nordal, Nils Huus, Oslo, Norway

[73] Assignee: Nyegaard & Co. A/S, Oslo, Norway

[22] Filed: Oct. 30, 1968

[21] Appl. No.: 772,014

[30] Foreign Application Priority Data

Nov. 9, 1967    Great Britain............51,144/67

[52] U.S. Cl............260/470, 260/471 R, 260/471 C, 260/501.17, 260/501.19, 260/513.6, 260/518 A, 260/518 R, 260/519

[51] Int. Cl............................................C07c 143/52
[58] Field of Search ........260/470, 513.6, 519, 502.6

[56] References Cited

UNITED STATES PATENTS

| 3,124,610 | 3/1964 | Larsen | 260/501 |
| 3,067,237 | 12/1962 | Larsen | 260/470 |

FOREIGN PATENTS OR APPLICATIONS

| 879,050 | 10/1961 | Great Britain |
| 1,155,119 | 10/1963 | Germany |

OTHER PUBLICATIONS

Audrieth. J. Org. Chem. Vol. 9 pages 89– 101 (1944). QD 241J6.

*Primary Examiner*—Lorraine A. Weinberger
*Assistant Examiner*—John F. Terapane
*Attorney*—Bacon & Thomas

[57] ABSTRACT

Process for the preparation of acylamido -2,4,6-triiodobenzoic acids, useful as x-ray contrast agents, which comprises the use of sulphamic acid derivatives of benzoic acid as intermediates wherein the intermediates have the general formula

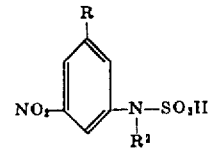

wherein:

R is a carboxyl group of an alkoxy carbonyl group wherein the alkoxy group contains one to five carbon atoms;

$R^2$ is hydrogen, alkyl having from one to five carbon atoms, alkyl having from one to five carbon atoms substituted by hydroxy, carboxyl, alkoxy carbonyl having one to five carbon atoms in the alkoxy group, and ether groups having one to five carbon atoms. The salts of these compounds with bases can also be used.

5 Claims, No Drawings

PROCESS FOR THE PREPARATION OF ACYLAMIDE-2,4,6-TRIIODOBENZOIC

This invention relates to novel intermediates of use in the preparation of X-ray contrast agents.

A number of widely used X-ray contrast agents are acylamido-2,4,6-triiodobenzoic acids and among these, 3-acetamido-5-N-methylacetamido-2,4,6-triiodobenzoic acid (metrizoic acid) is particularly important. These substances are used in large quantities and it is desirable that they should be produced as economically as possible. It is an object of the present invention to provide a new route to the above and other iodinated benzoic acid derivatives which will allow of particularly economical production.

The basis of our new process is the use of sulphamic acid derivatives of benzoic acid as intermediates and in particular, acids of the general formula

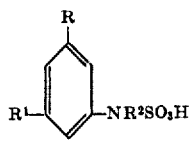

(where $R^1$ is a nitro group or the group —$NR^3SO_3H$; $R^2$ and $R^3$, which may be the same or different, are hydrogen atoms or substituted or unsubstituted aliphatic groups and R is a carboxyl group or an esterified carboxyl group) and their salts with bases.

Where R is an esterified carboxyl group it may, for example, be an alkoxycarbonyl group, e.g. a methoxy or ethoxy-carbonyl group.

The compounds of formula I in which $R^1$ is a nitro group or a group $NHSO_3H$ and $R^2$ is hydrogen can readily be prepared from 3,5-dinitrobenzoic acid or an ester thereof by the Piria reaction that is by reaction of one or both of the nitro groups with a source of sulphite, bisulphite or dithionite ions. This reduction is preferably carried out in an aqueous medium, the 3,5-nitrobenzoic acid being preferably dissolved as a water soluble salt thereof, for example an alkali metal salt such as a sodium or potassium salt, or an ammonium salt. The source of sulphite, bisulphite or dithionite ions may be a sulphite, bisulphite or dithionite reducing agent and this may, for example, also be an alkali metal, e.g. sodium or potassium, salt or an ammonium salt. One convenient method of introducing sulphite or bisulphite is to pass sulphur dioxide into a reaction solution containing the appropriate hydroxide. A mixture of sulphite and bisulphite ions may be advantageous, a useful ratio being 1 mol sulphite to 2 mols bisulphite.

The reducing agent is preferably used in a slight excess, e.g. up to about 20 percent, for example about 10 percent, excess over the stoichiometric requirement. For selective reduction of a single $NO_2$ group, for example, about 3.3 mols of sulphite or 1.2 mols dithionite, is preferred.

In general, dithionite is more reactive than the sulphite reagents. The reaction temperature may be elevated and the conditions of time and temperature as well as concentration of dinitrobenzoic acid depend on the selectivity required. If only one $NO_2$ group is to be reduced, sulphites are preferably used at from 60° to 90° C, e.g. about 75° C, for about 4 hours while dithionite is effective at about 40° C in the same time. However, satisfactory reductions can be carried out at room temperature for longer times, e.g. 48 hours. A lower concentration of dinitrobenzoic acid increases the selectivity; when sulphites are used, the concentration of dinitrobenzoic acid is preferably below 10 percent by weight but dithionites, in allowing lower temperatures to be used for a given reaction time, permit higher dinitrobenzoic acid concentrations. In general, the lower the temperature and concentration, the greater the selectivity although longer reaction times will then be involved.

Where dithionite reducing agents are used, the pH is preferably in the range 7 – 8.

The products of formula I in which $R^1$ is a nitro group or a group $NHSO_3H$ and $R^2$ is hydrogen can then be converted into radiological compounds of the 3,5-diacylamido-2,4,6-triiodobenzoic acid type by the following reaction stages:

1. N-substitution to introduce a substituted or unsubstituted aliphatic group
2. Removal of $SO_3H$ from the unsubstituted or N-substituted sulphamino group or groups.
3. Reduction of the $NO_2$ group, where present,
4. Acylation of the amino group or groups which are produced and
5. Iodination, these steps being carried out in various sequences according to the products which are required.

A number of convenient reaction routes are shown in the following reaction diagram:

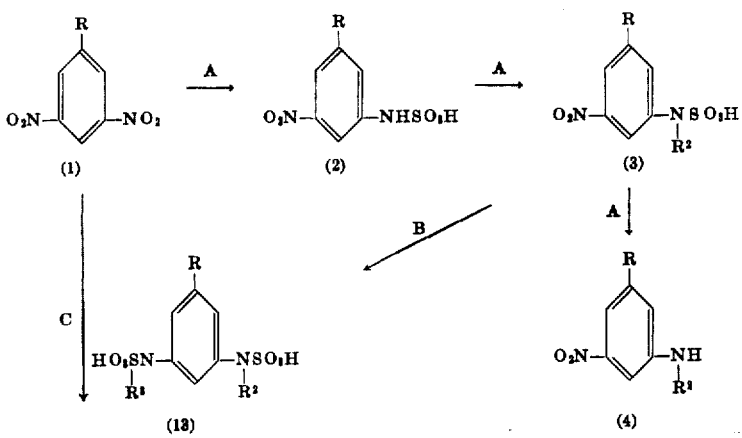

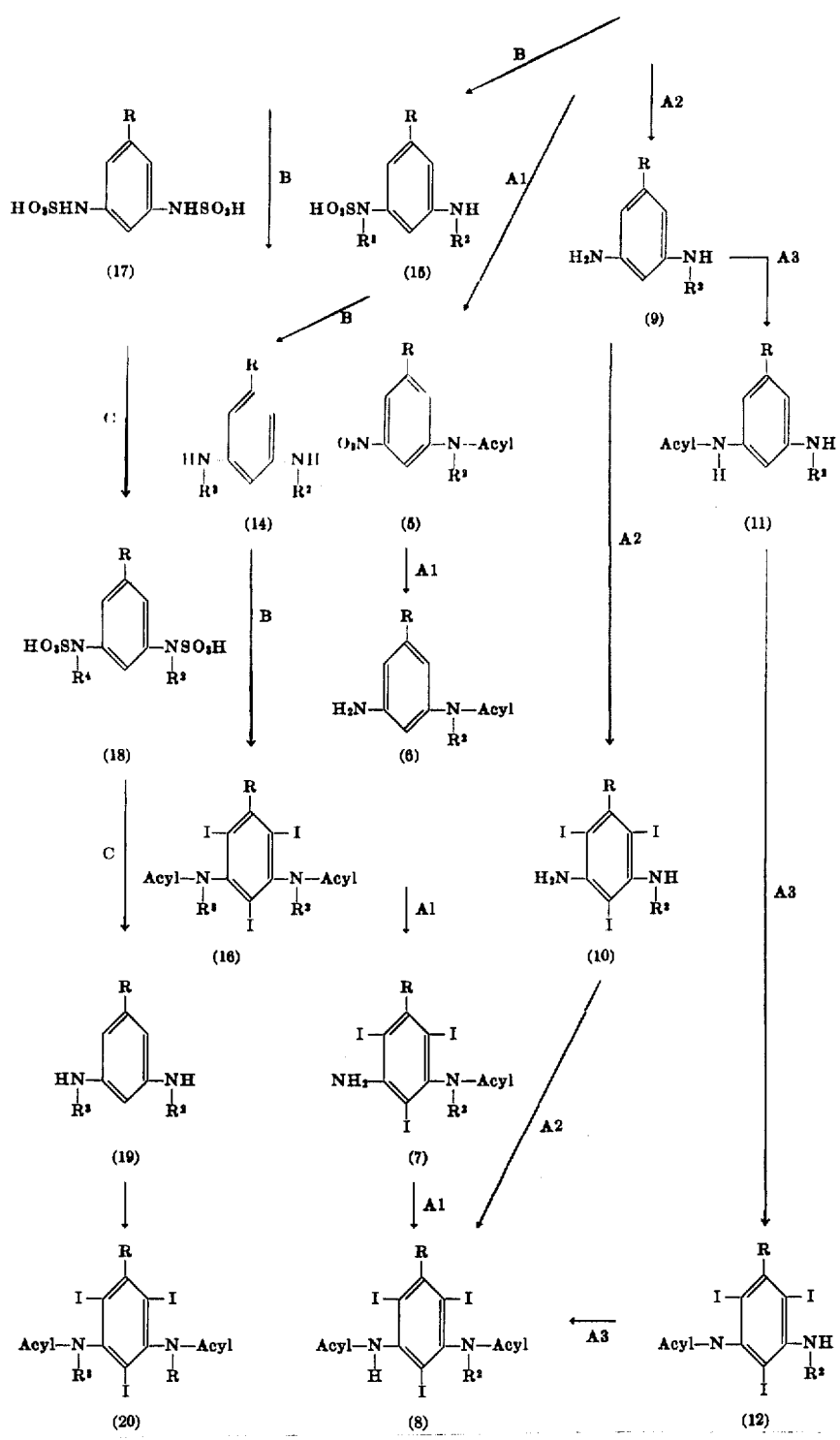

All the sulphamino compounds 2,3,13,15,17 and 18 are new compounds.

In the above diagram, R has the above meaning and $R^2$ and $R^3$ which may be the same or different represent unsubstituted or substituted aliphatic groups.

The groups $R^2$ and $R^3$, may for example, be saturated or unsaturated hydrocarbon groups having one to five carbon atoms e.g. alkyl groups such as methyl, ethyl, propyl, butyl or amyl groups. Methyl groups are particularly preferred. Where the above substituents are substituted aliphatic groups, they may carry, for example, hydroxyl or carboxyl groups or esterified carboxyl or ether groups, preferably having one to five carbon atoms. The β-hydroxy ethyl group is of particular interest. The acyl group or groups may, for example, be those derived from aliphatic carboxylic acids, e.g. having one to five carbon atoms, for example acetic, propionic, valeric acid etc. Acetyl groups are preferred.

Where free carboxyl or sulphamino groups are present, the various compounds may exist in the form of salts with bases, e.g. alkali metal or alkaline earth metal salts or salts with ammonia or amines. Where R is an alkoxy carbonyl group, the alkoxy group preferably contains one to five carbon atoms.

The preferred sequence of reactions is that following the arrows marked A. This sequence leads to N-monosubstituted 3,5-diacylamido compounds including the particularly important compound metrizoic acid and its esters. A compound of formula I which has been selectively reduced (Formula 2) may first be reacted with a reagent serving to introduce a group $R^2$, that is a substituted or unsubstituted aliphatic group which may be saturated or unsaturated, whereby a compound of formula (3) is produced. In general the reagent may be a reactive ester of a corresponding alcohol, e.g. a halide (chloride, bromide or iodide), sulphate or aryl-sulphonate. Hydroxyethyl groups can be introduced by reaction with ethylene oxide as well as by reaction of such reactive ester reagents as ethylene chlorhydrin or bromhydrin. Reactive ester reagents are preferably used in the presence of a base as acid binding agent e.g. an inorganic base such as a hydroxide, carbonate or bicarbonate of an alkali metal or alkaline earth metal, or an organic base such as a tertiary amine e.g. triethylamine, etc. $R^2$ is preferably a methyl group and the preferred reagent is dimethyl sulphate, preferably used in excess, e.g. about 3-4 equivalents. The reaction temperature is not critical but room temperature, e.g. 10°-15° C, is preferred.

The compound (3) may then be treated to remove the group $SO_3H$, e.g. by hydrolysis, preferably using a mineral acid, e.g. hydrochloric, hydrobromic, sulphuric or phosphoric acid, advantageously at a pH less than 1. The product then has the formula (4) shown above.

The foregoing process A represents an especially convenient and economical method of producing the mono-alkylated amine of formula (4) particularly in avoiding production of mixtures of compounds which are difficult and expensive to separate in commercial manufacture.

The compound of formula (4) may then be converted into the desired product by one of the routes $A_1$, $A_2$ and $A_3$ shown in the above diagram.

In route $A_1$, compound (4) may be reacted with an acylating agent to form a compound of formula (5). The acylating agent may be, for example, a halide, e.g. a chloride, of a carboxylic acid Acyl OH or, more preferably the anhydride.

An excess of acylating agent is preferably used and, for example, using acetic anhydride, the most preferred reagent, about 100 percent excess is advantageous. The reaction temperature is preferably elevated e.g. about 70°-90 C.

The product of formula (5) may then be subjected to reduction using a reagent capable of reducing a nitro group to an amino group whereby a compound of formula (6) is produced. Hydrazine and Raney nickel have been used successfully; one preferred reducing method being, however, catalytic hydrogenation using platinum, palladium etc. as catalysts, palladium on charcoal being preferred. The hydrogenation is preferably effected at neutral pH.

The product of formula (6) may then be iodinated for example using conventional reagents for iodinating aromatic nuclei e.g. iodine monochloride or an alkali metal iododichloride. Addition of an alkanol, preferably methanol, or acetic acid often helps to avoid precipitation of diiodinated products.

The product of formula (7) may finally be acylated to give a radiological product of formula (8). Where $R^2$ is methyl and Acyl represents an acetyl group, the product is metrizoic acid or an ester thereof.

The compounds of formula (4) may also be converted by the route A2 whereby reduction is effected initially to give compounds of formual (9). The optimal reduction conditions are approximately the same as for the production of compounds of formula (6). There is a tendency, however, for the product to oxidize and oxygen should therefore preferably be excluded, e.g. by introducing an inert atmosphere such as nitrogen during or after hydrogenation.

The compounds of formula (9) may then be iodinated according to the procedure described for production of compounds of formula (7). The medium is preferably acid to increase the stability of the starting compound and the order of stabilization by acids is as follows:

$HClO_4\ H_2SO_4\ HNO_3\ HCl\ CHOOH\ CH_3COOH\ H_2O$.

Bis-acylation may then follow using the procedure described for production of compound (8) by route A1, except that 2 mols of acylating agent will be used per mol of compound (10).

Routes A1 and A2 are particularly preferred for the preparation of metrizoic acid and its esters.

A further variation is route A3 whereby compounds of formula (9) may be mono-acylated to give compounds of formula (11). The acylating agent may be one of those referred to above for the preparation of compounds of formula (5) and even free carboxylic acids such as acetic acid have been found to produce a satisfactory selective acylation of the primary amino group. Indeed, acetic acid appears to be slightly more selective than acetic anhydride. Using acetic acid the reaction is preferably effected in an aqueous medium at elevated temperature e.g. 80°-90° C.

The products of formula (11) can then be iodinated by the procedure described previously for production of compounds of formula (7), to give compounds of formula (12).

Finally, the compounds of formula (12) may be further acylated, using the method described for the production of compounds of formula (8).

A further route for the production of radiological compounds is that shown by arrows annotated B in the above diagram. Compounds of formula (3) may be subjected to reduction with sulphite, bisulphite or dithionite, as described for the production of compounds of formula I, to give intermediate disulphamic acids which may then be reacted with a reagent introducing a substituted or unsubstituted aliphatic group $R^3$ to form compounds of formula (13). This reaction may be accomplished by the methods described for the production of compounds of formula (3).

The compounds of formula (13) may then be treated to convert the sulphamino groups into amino groups e.g. by hydrolysis, as described for the production of compounds of formula (4), to give compounds of formula (14). Iodination of these products, for example by the methods described for the production of compounds of formula (7), and acylation as described for production of compounds of formula (8) then yields compounds of formula (16) which are desired radiological compounds. This method yields compounds carrying aliphatic substituents at both nitrogen atoms.

It is possible to carry out the reduction of compounds of formula (4) using sulphite, bisulphite or dithionite reducing agents to produce mono-sulphamino compounds which may either be acylated and hydrolyzed by the above-described general procedures to form compounds of formula (6) or may first be reacted with a reagent serving to introduce a substituted or unsubstituted aliphatic group $R^3$ to form a compound of formula (15) followed by hydrolysis to form compounds of formula (14) as shown in the above diagram.

A still further route to the production of radiological compounds is that shown in the above diagram by arrows annotated C. A disulphamic acid of formula I, $R^1=NHSO_3H$ that is a compound of formula (17), may be reacted with a reagent serving to introduce a substituted or unsubstituted aliphatic group, e.g. one of the reagents described above for the introduction of the group $R^2$. This yields compounds of formula (18) in which $R^2$ and $R^3$ are identical aliphatic substituents. Subsequent treatment to convert the sulphamino group into amino, e.g. hydrolysis, then yields corresponding compounds of formula (19). Alternatively, the compound of formula (17) can be converted directly into a compound of formula (19) in which $R^2$ and $R^3$ are both hydrogen, e.g. by hydrolysis.

Iodination and acylation of the compounds of formula (19) then yields compounds of the formula (20) which are desired radiological compounds.

As indicated previously R may be a carboxyl group or an esterified carboxyl group, e.g. an alkoxy carbonyl group. Where an acid is ultimately required, and the final product of the above sequences is an ester, the ester can be subjected to hydrolysis, for example under basic conditions e.g. with concentrated aqueous alkali metal hydroxide, or to aminolysis by reaction with an amine e.g. a primary, secondary or tertiary amine such as dimethylamine, diethylamine or trimethylamine.

It should be noted that basic hydrolysis will not convert a sulphamino group to an amino group so that R can be converted from an ester group into a carboxyl group in the presence of a sulphamino group.

On the other hand, the acid conditions used to hydrolyze sulphamino groups do not readily hydrolyze the carboxylic ester group.

Where salts of the acids are required these can readily be formed from the acids by reaction with bases; particularly useful salts are sodium salts and diethanolamine and N-methyl glucamine salts.

For the better understanding of the invention, the following examples are given by way of illustration only:

EXAMPLE 1

3-N-methylamino-5-nitrobenzoic acid. Reduction of 3,5-dinitrobenzoic acid to form the disodium salt of 3-nitro-5-sulphamino benzoic acid 150 g. (0.71 mole) of 3,5-dinitrobenzoic acid are suspended in 1,500 cc water and brought into solution by adding 15N NaOH to pH 4.3. The solution is heated to 75° C and 156.6 g (1.75 eqv.) $Na_2SO_3$ and 100.5 g (1.5 eqv.) $Na_2S_2O_5$ dissolved in 1,500 cc water are added with good stirring over a period of 4 hours, giving a red-brown reaction mixture of pH 3.3. (Reduction product is not isolated in the process).

A paper chromatogram of the reaction mixture (n-BuOH : EtOH : $NH_3$ : $H_2O - 4 : 1 : 2 : 1$) shows 10 percent unreacted dinitrobenzoic acid, 75 % substance; $R_f$ 0.19 (2) and 15 percent $R_f = 0$ (not identified).

An aliquot of the solution was adjusted pH to 7, concentrated in vacuo, NaCl added and the precipitated substance crystallized from water and water/ethanol gave a light yellow compound, m.p. 350° C,$R_f = 0.19$ (above system), namely 3-nitro-5-sulphaminobenzoic acid.

Found: C 25.66 percent; H 1.86 percent; N 8.74 percent; S 9.56 percent

Calcd.: $C_7H_4N_2O_7SNa_2$, $H_2O$

C 25.93 percent; H 1.86 percent; N 8.64 percent; S 9.89 percent

Hydrolysis with hydrochloric acid gives 3-amino-5-nitrobenzoic acid, identified by IR. spectrum.

EXAMPLE 2

Methylation of sulphamic acid to form 3-N-methyl-sulphamino 5-nitrobenzoic acid

The red-brown reaction mixture from Example 1 (pH 3.3) is cooled to 10°–15° C and 180 ml (4 eqv.) 15N NaOH are added. 200 ml (3 eqv.) dimethyl sulphate are added with good stirring over a period of 1 hour. After stirring 30 min. at 10°–15° C, a further 67 ml (1 eqv.) dimethyl sulphate were added with good stirring during 20 min. and the stirring maintained for another 30 minutes.

A paper chromatogram (BuOH : EtOH : $NH_3$ : $H_2O - 4 : 1 : 2:1$) shows about 10 percent unreacted 3,5-dinitrobenzoic acid, about 75 percent; ($R_f = 0.2$) of title compound and about 15 percent; $R_f = 0$ (not identified, 2 – 3 spots). M.p. about 300° C.

Analysis: Calculated for $C_8H_6N_2O_7SNa_2, 7.5 H_2O$; S 9.24 percent N 8.07 percent Found S 8.85 N 8.55

EXAMPLE 3

Hydrolysis to form 3-N-methylamino-5-nitrobenzoic acid

To the red-brown reaction mixture from Example 2 were added 250 cc conc. HCl. Stirring at room temperature for 2 hours gave only traces of precipitate. Raising the pH to 2.7 by adding 110 cc 19N NaOH resulted in a yellow brown crystalline substance which was filtered off after stirring over night at 10°– 15° C.

Yield 97.5 g, (70 percent of theory), m.p. 188° – 192° C.

Paper chromatogram (above syst.) showed 5 percent 3,5 dinitrobenzoic acid and 95 percent ($R_f = 0.53$) of title compound.

The acid is suspended in water (conc. 20 percent) and dissolved by addition of ammonium hydroxide solution. By addition of 10 percent/w/v) solid ammonium chloride the ammonium salt of the reaction product is salted out. After isolation by filtration the ammonium salt is dissolved or suspended in water and the acid precipitated by addition or hydrochloric acid to pH 3.0. Yield 85 percent over the purification steps; m.p. 200° – 203° C (lit. 198° – 200° C). Found; C 48.47, H 4.39, N 14.31 percent Calc for $C_9H_8N_2O_4$; C 48.90, H 4.08, N 14.30 percent.

This procedure of making 3-N-methylamino-5-nitrobenzoic acid is reproduced on the 600 g, 8 kg and 16 kg scale with total yields of 55 – 65 percent. Tables 1 and 2 show chromatographical estimation of several laboratory reductions and table 3 shows yields of methylated and hydrolyzed products.

EXAMPLE 4

3-N-methylacetamido-5-nitrobenzoic acid 588 g. (3 mole) 3-N-methylamino-5-nitrobenzoic acid are suspended in water and dissolved by adding 10N pH to ph 7 and heating to 80° C. 715 cc (7 mole) acetic anhydride are added with good stirring over a period of 20 min., the temperature rising to 86° C. The stirring is rolonged for 1 hour at about 70° – 80° C and left with stirring overnight at 10° – 15° C and the precipitate isolated. Yield of crude material 670 g (94 percent) m.p. 212°– 224° C. Purified over $NH_4$—salt in water 1:10 with 10 percent $NH_4Cl$, the acid precipitated from water with hydrochloric acid at pH 1. Yield 90 percent of a white-yellow material with m.p. 225°– 228° C (lit. 222°– 224° C).
Chromatogram (BuOH : EtOH : $NH_4$ : $H_2O$ – 4 : 1 : 2 : 1); $R_f = 0.57$.
Found: N 11.48, C 54.94, H 4.09 percent;
Calcd. for $C_{10}H_{10}N_2O_5$ ; N 11.76, C 50.42, H 4.23 percent.

EXAMPLE 5

3-Amino-5-N-methylacetamido-benzoic acid 118 g. (0.5 mole) 3-N-methylacetamido-5-nitrobenzoic acid and 50 cc 10N NaOH are added in portions to 60 cc water under good stirring. The yellow brown solution, (220 cc) is hydrogenated in a 500 cc hydrogenation-vessel with 2 g 3 percent Pd/C, at slight overpressure at temp. 50° C for 30 hours. The Pd/C is filtered off and the clear, colorless solution is acidified with 68 cc concentrated hydrochloric acid to pH 1.

A white crystalline precipitate is filtered off after 3 hours at 3° C.
Yield: 105 g (86.0 percent), m.p. 165° – 198° C, calculated as $C_{10}H_{12}N_2O_3$, HCl
In a parallel experiment the hydrogenated solution is acidified by 50 percent $H_2SO_4$, pH 1, precipitated a white crystalline substance, yield 146 g (90 percent); m.p. 235° C. ($R_f = 0.28$, above syst.).
Found: C 36.80 percent; H 4.94 percent.
Calcd. for $C_{10}H_{12}N_2O_3.H_2SO_4.H_2O$; C 37.03 percent; H 4.97 percent.

EXAMPLE 6

23.8 (0.1 mole) 3-N-methylacetamido-5-nitrobenzoic acid is suspended in 150 cc water and dissolved by 10 cc 10N NaOH to pH 6.2 — charcoal is added and then removed by filtration. The solution is hydrogenated with 3 percent Pd/C for 3 hours. The solution is colorless showing only one spot $R_f = 0.28$ on a paper chromatogram (system BuOH : EtOH : $NH_3$ : $H_2O$ – 4 : 1 : 2 : 1).

EXAMPLE 7

An aliquot of the hydrogenated solution from Example 6, containing 2.08 g (10 mmole) 3-amino-5-N-methylacetamido benzoic acid, is acidified by 2 cc concentrated HCl and diluted with water to a volume of 270 cc and heated to 50° C and, under mechanical stirring, 10 cc of 3.3N $NaICl_2$ (3.3 eqv.) is added over a period of 30 minutes. After adding ⅓ of the iodination solution, an oil started to precipitate. The stirring is prolonged for 1 hour at 50° C. By stirring over night, a crystalline substance could be isolated, yield: 5.4 g (92 percent of theor.).

Chromatogram (above system) showed about 30 percent endo-isomer ($R_f = 0.43$) and 70 percent exo-isomer ($R_f = 0.56$) of the triiodinated product and traces of diiodo compound (2,6-diiodo ($R_f = 0.44$) and endo-isomer ($R_f = 0.35$), exo ($R_f = 0.50$) of 4,6-diiodo compound).

A sample of the product was acetylated and a diiodo estimation of the crude metrizoic acid showed 2 percent of diiodo compound and beyond that showing, in a 25 mg chromatogram, only the endo- and exo-forms of metrizoic acid.

EXAMPLE 8

Iodination in the Presence of Ethanol

An aliquot of the hydrogenated solution from Example 6 containing 2.08 g (10 mmole) 3-amino-5-N-methyl-acetamido benzoic acid is acidified by 2 cc concentrated HCl and diluted with water to a volume of 74 cc and 12 cc ethanol added. The solution is heated to 50° – 55° C and 10 cc 3.3N $NaICl_2$ (3.3 eqv.) is added over a period of 30 min. After about one third of the iodination solution has been added a slight opacity occurs, but no precipitation. The reaction mixture is stirred at 50° – 55° C for 1 hour, and precipitation of a light yellow-brown substance gradually starts. Stirring is continued overnight at room temperature. Yield 5.5 g (94 percent).

Paper chromatography (above system) shows about 20 percent endo— and 80 percent exo-form of triiodo product with traces of diiodo compound.

EXAMPLE 9

Iodination in the Presence of Acetic Acid

An aliquot of hydrogenated solution from Example 6 containing 2.08 g (10 mmole) 3-amino-5-N-methyl-acetamido benzoic acid (24 cc) is diluted by 24 cc acetic acid and heated to 50° – 55° C.

Under good stirring, 10 cc of 3.3N $NaICl_2$ are added over a period of 15 min. and no precipitation occurs. After stirring for 1 hour at 50° – 55° C precipitation of a yellow-white substance starts. Stirring is prolonged for 3 hours at 50° – 55° C and overnight at room temperature. Yield: 4.6 g (78.0 percent).

Paper chromatography (above system) showed mostly the exo-form of the triiodoproduct and only small traces of a diiodo compound.

Iodination of the isolated hydrochloride and hydrosulphate salts of 3-amino-5-N-methylacetamido benzoic acid in water/ethanol and water/methanol is proceeding.

The diiodo compounds are chromatographically shown to be a mixture of 3-amino-5-methyl-acetamido-2,6-diiodobenzoic acid ($R_f = 0.44$) and endo ($R_f 0.35$), exo ($R_f 0.50$) forms of 3-amino-5-N-methyl-acetamido-4,6-diiodobenzoic acid.

EXAMPLE 10

N-Monomethyl-3,5-diacetamido-2,4,6-triiodobenzoic acid 3-(N-methyl)-acetamido-5-amino-2,4,6-triiodobenzoic acid (1.0 g.) was suspended in acetic anhydride (2.5 ml.) and warmed gently whereafter one drop of concentrated sulphuric acid was added. The mixture became transiently clear and was boiled for about 2 minutes whereby about half of the acetic anhydride distilled off. After the mixture had adopted room temperature the crystallized material was filtered, washed with little acetic anhydride, suspended in water (about 5 ml.) and concentrated ammonia added to strongly alkaline reaction and the mixture heated to boiling. About 50 mg. of insoluble methyl N-methyl-3,5-diacetamido-2,4,6-triiodobenzoate remained on the filter, and concentrated hydrochloric acid was added to the filtrate whereby N-methyl-3,5-diacetamido-2,4,6-triiodobenzoic acid precipitated, weighing 0.9 g. (about 84 percent, m.p. 265° C, I = 60.9 percent (61.5; 60.3 percent), calc. 60.65 percent; N = 4.45 percent (4.47; 4.43 percent), calc. 4.46 percent after washing with water and drying in vacuo. A further quantity of the same substance could be recovered on concentration of the mother liquors.

EXAMPLE 11

19.6 g. 3-N-methylamino-5-nitrobenzoic acid were added to 180 ml of water. Then 17 ml concentrated HCl (2 equivalents) were added. Some of the material dissolved. After heating up to 50° – 60° C the suspension was hydrogenated with Pd/charcoal as catalyst. Hydrogenation period : 3 hours. Pd/charcoal was filtered off. The filtrate was colorless (clear). A chromatogram of the solution mainly showed the wanted material, N-monomethyl-3,5-diamino benzoic acid.

EXAMPLE 12

Neutral hydrogenation 5 g. of 3-N-methylamino-5-nitrobenzoic acid were dissolved as Na-salt, pH 7, in 150 ml of water. Hydrogenation was carried out as described in Example 11. The solution was also colorless (clear) after hydrogenation, but gradually went dark.

The product was precipitated by addition of 2N sulphuric acid and recrystallized from water, M.p.142°–8° C Analysis: Calculated for $C_8H_{10}N_2O_2.H_2SO_4$ C 36.34 percent H 4.85 percent N 10.46 percent S 11.57 percent C 36.36 percent H 4.58 percent N 10.60 percent S 12.13 percent

EXAMPLE 13

Hydrogenation in methanol 10 g. of 3-N-methylamino-5-nitrobenzoic acid were dissolved with 150 ml of MeOH with heating and treated with 100 mg of charcoal. The solution was hydrogenated with Pd/charcoal as catalyst for 2 hours. The filtrate showed a yellow green color after hydrogenation. The color did not disappear when retreated with charcoal, but increased Methanol standing. The chromatogram of the solution mainly showed the wanted material, however, distinct green fluorescence showed. Methanol was distilled off in vacuo down to 20 ml and grey green material crystallized out on standing overnight in the refrigerator. After filtration the material was pistol dried. Weight: 5.2 g, m.p. 174° – 179° C. Another 2.3 g. of grey green material were obtained from the filtrate. $R_f: 0.18$.

Paper chromatogram;BuOH : EtOH : $NH_3$ : $H_2O$ (4 : 1 : 2 : 1)

EXAMPLE 14

Iodination 25 ml of hydrogenated filtrate from Example 11 (1.6 N-monomethyl-3,5-diaminobenzoic acid hydrochloride) was diluted with water to 320 ml and 2 ml conc. HCl (excess) added. 10 ml of 3.3 N-$NaICl_2$ were added dropwise with stirring in the course of 1 hour at 10° – 15° C. Gradual precipitation of grey material that slowly became red-brown occurred. Addition was continued with stirring for 2 hours. The product was filtered, washed on the filter with little water and dried. Yield: 3.6 g (red-brown material) (70 percent) M.p. 91°–92° C (d).

Iodine theoretical 70 percent. Found 64.8 percent. (Rf.: 0.51).

EXAMPLE 15

3-Acetamido-5-N-methylaminobenzoic acid 20 ml of about 10 percent hydrochloric acid solution of N-monomethyl-3,5-diaminobenzoic acid was heated on a steam bath with 5 ml of acetic acid at 80° – 90° C for 2 hours. The solution was evaporated to dryness in vacuo. The residue was dissolved in water. Undissolved material was filtered off. Then the material was again dissolved in about 20 ml of water by addition of $NH_3$ to pH 7, treated with charcoal at 70° C and filtered. The filtrate was weakly colored. It was acidified with HCl, pH 2.and a grey-white material precipitated and was filtered off after standing at 0° C for 1 hour. Pistol dried. Weight: 900 mg (ca. 45 percent yield). Recrystallization from EtOH, m.p. 227°–231° C, $R_f: 0.30$.

EXAMPLE 16

Iodination of 3-acetamido-5-N-methylaminobenzoic acid 240 mg of 3-acetamido-5-N-methylamino benzoic acid was dissolved in 25 ml of water. Some drops of concentrated HCl added until all was dissolved. On dropwise addition of 1 ml of 3.5 — N NaICl$_2$ (3.3 eqv.), a grey-brown material precipitated slowly. After stirring for 2 hours, the product was filtered, washed on the filter with a little water and pistol dried. Weight: 500 mg. (94 percent yield calculated for diiodide). Reprecipitation of the acid from water in the presence of Na$_2$S$_2$O$_4$ gave a grey-white material.

Iodine analysis gave 54.4 percent of iodine. (diiodide calculated to 55.2 percent). m.p. 184° C (dec.) R$_f$: 0.34. Paper chromatogram:

BuOH : EtOH : NH$_3$ : H$_2$O (4 : 1 : 2 : 1).

EXAMPLE 17

Alkylation of 3-nitro-5-sulphaminobenzoic acid

A. 3-Nitro-5-N-propylaminobenzoic acid

The disodium salt of 3-nitro-5-sulphaminobenzoic acid (3.24 g, 0.01 mole) was dissolved in water (50 ml) and 10N sodium hydroxide solution (4 ml) was added. Propyl iodide (6.8 g, 0.04 mole) was added by stirring at 70° C and the reaction mixture was stirred at 70° for 28 hours. After decanting the unreacted propyl iodide a sample was withdrawn for paper chromatography.

In a system consisting of N-BuOH : EtOH : NH$_4$OH (25 percent): H$_2$O = 4 : 1 : 2 : 1 the R$_f$ value of 3-nitro-5-N-propylsulphaminobenzoic acid was determined as 0.36. Concentrated hydrochloric acid (3 ml) was added to the reaction mixture and the solution was heated to 70° C. A pale brown product started to crystallize. After some hours at 3° C. the 3-nitro-5-N-propylaminobenzoic acid (1.3 g) was isolated. Melting point (crystallized from ethanol/water 1 : 2); 193°–196° C. A test for Cl$^-$ and SO$_4^{2-}$ was negative. Paper chromatography: n-BuOH : EtOH : NH$_4$OH(25 percent) : H$_2$O = 4 : 1 : 2 : 1;R$_f$ 0.82–0.87 n-BuOH : AcOH : H$_2$O = 100 : 22 : 50; R$_f$ 0.90 – 0.95

B. 3-N-(β-hydroxyethyl)-amino-5-nitrobenzoic acid

The disodium salt of 3-nitro-5-sulphaminobenzoic acid (3.24 g, 0.01 mole) was reacted with ethylene bromohydrin (6.25 g, 0.04 mole) as described above. The bromohydrin was added dropwise in the course of 30 minutes. The reaction was complete in 3½ hours at 70° C. From a sample of the solution the R$_f$ value of 3-N-(β-hydroxyethyl)-sulphamino-5-nitro-benzoic acid was calculated as 0.23 in the n-BuOH : EtOH : NH$_4$OH : H$_2$O-system.

2N-Sulphuric acid (5 ml) was added to the reaction mixture and the solution was kept at 70° C for 1 hour. On cooling the 3-N-(β-hydroxyethyl)-amino-5-nitrobenzoic acid crystallized as a pale brown compound. Yield: 1.35 g. M.p. (cryst. from water) 161° – 163° C. A test for SO$_4^{2-}$ was negative. Paper chromatography:

n-BuOH:EtOH:NH$_4$OH(25 percent): H$_2$O = 4:1:2:1;R$_f$ 0.54 – 0.59 n-BuOH:AcOH:H$_2$O = 100:22:50; R$_f$ 0.88 – 0.93

An aliquot of the solution was concentrated in vacuo and the material then crystallized out. Recrystallization from water and then methanol/water yielded pale yellow crystals m.p. about 300° C.

Analysis: Calculated for C$_9$H$_8$N$_2$O$_6$SNa$_2$. H$_2$0 S 8.71 percent
Found S 8.60 percent

EXAMPLE 18

Sodium 3-nitro-5-ethoxycarbonylphenylsulphamate

Ethyl 3,5-dinitrobenzoate (24.0 g, 0.1 mole) was dissolved in ethanol (600 ml) at 80° C. Water (60 ml) was added to the solution. Na$_2$SO$_3$ . 7H$_2$O (37.8 g, 0.15 mole) and Na$_2$S$_2$O$_5$ (14.3 g, 0.075 mole) were dissolved in water (200 ml) and the solution was added with stirring dropwise to the solution of the ester in the course of 2½ hours at 80° C. The stirring was continued for 2 hours at 80° C, the reaction mixture was filtered and the filtrate (pH 7.2) was concentrated in vacuo to 250 ml. After cooling for some hours in a refrigerator, a yellowish crystalline product was isolated. Yield: 20.8 g (66.0 percent). M.pt: A possible dehydration occured at 115°–135° C. The compound melted at 140° – 146° C. A sample twice crystallized from water melted at 140° – 156° C. with a possible dehyration stated at 130° C. Paper chromatography:

n-BuOH:EtOH:NH$_4$OH(25 percent):H$_2$O = 4:1:2:1 R$_f$ 0.72 – 0.77 n-BuOH:AcOH:H$_2$O = 100:22:50 R$_f$ 0.53 – 0.58

Analysis calculated for

C$_9$H$_9$N$_2$O$_7$ SNa. C 34.64; H 2.90; N 8.97; S 10.27
Found C 34.97; H 3.32; N 9.04; S 9.97

EXAMPLE 19

3-N-methylamino-5-nitrobenzoic acid

The sodium salt of ethyl 3-nitro-5-sulphaminobenzoate (3.12 g, 0.01 mole) was suspended in water (50 ml). 10N NaOH (5 ml) was added and the compound went momentarily into solution. A paper chromatographic test showed that a hydrolysis of the ester already had occurred. Dimethylsulphate (5.04 g, 0.04 mole) was added by stirring to the solution at 20° C in the course of 15 minutes. After stirring for further 30 minutes concentrated hydrochloric acid (2 ml) was added and the mixture heated to 70° C and kept at that temperature for 1 hour. The pH was increased to 3.1 by addition of 10N NaOH and a pale brown compound started to crystallize. It was isolated 1.1 g (56.0 percent). m.p. 187° – 205° C. Identity with 3-N-methyl-amino-5-nitrobenzoic acid was demonstrated by paper chromatography and IR spectroscopy.

Before the acidic hydrolysis of the sulphamido compound a sample was withdrawn for paper chromatography. The compound had the same R$_f$ value as the 3-N-methylsulphamino-5-nitrobenzoic acid previously described. The compound (2) was made available by an alkaline hydrolysis of the sodium salt of ethyl 3-nitro-5-sulphamino-benzoic acid at room temperature. Its identity with the disodium salt of 3-nitro-5-sulphaminobenzoic acid was shown by paper chromatography and IR spectroscopy.

EXAMPLE 20

Ethyl 3-amino-5-nitrobenzoate

The sodium salt of ethyl 3-nitro-5- sulphaminobenzoate (3.12 g. 0.01 mole) was dissolved in water (25 ml) at 70° C and 2N $H_2SO_4$ (10 ml) was added. After about 2 minutes a pale yellow compound started to crystallize. The suspension was kept at 70° C for 15 minutes and then cooled to room temperature.

It was isolated 1.5 g (71.5 percent), m.p. 156°–158° C. Recrystallization from ethanol gave a product of m.p. 161°– 163° C.
Found: C 51.96; H 4.84; N 13.44
Calcd. for $C_9H_{10}N_2O_4$: C 51.50; H 4.77; N 13.32 percent
A test for sulphur was negative.
Paper chromatography:
n-BuOH : EtOH: $NH_4OH$ (25 percent) : $H_2O$ = 4:1:2:1 $R_f$ 0.93 – 0.98
n-BuOH : AcOH : $H_2O$ = 100 : 22 : 50 $R_f$ 0.91 – 0.96

To prove the constitution of the compound it was hydrolyzed in alkali at 70° C. The 3-amino-5-nitrobenzoic acid was precipitated at pH 3, m.p. 208°– 213° C. Its identity with authentic 3-amino-5-nitrobenzoic acid was shown by paper chromatography and IR spectroscopy.

EXAMPLE 21

Partial reduction of 3,5-dinitrobenzoic acid with sodium dithionite ($Na_2S_2O_4$)

3,5-Dinitrobenzoic acid (21.2 g, 0.1 mole) was suspended in water (210 ml). 10N sodium hydroxide solution (30 ml, 0.3 mole) was added. To the stirred solution, which contained traces of precipitated sodium salt of dinitrobenzoic acid, a solution of sodium dithionite dihydrate (23 g, 0.11 mole in 210 ml water) was added dropwise by stirring in the course of 15 minutes. The temperature increased to 38° C. The precipitated sodium salt dissolved during the addition of dithionite. The stirring was continued for 24 hours.

The solution was acidified with concentrated hydrochloric acid (40 ml.), heated to 70° C and kept at that temperature for 1 hour. The 3-amino-5-nitrobenzoic acid was precipitated by adding 10N NaOH to pH 3.0.
Yield: 16.0 g (88 percent), m.p. 205°– 208° C., purity: 95 percent.

The compound was shown identical with authentic 3-amino-5-nitrobenzoic acid by paper chromatography and IR spectroscopy.

The following tables illustrate the reduction system used in the present invention.

Table No. 1 shows the reduction of 3,5-dinitrobenzoic acid with $Na_2SO_3$ and $Na_2S_2O_5$ in suspension. The tests were carried out in a 500 ml glass beaker, stirred by a magnet at 70°–75° C. on a hot plate. 10 g. of dinitrobenzoic acid were suspended in 100 of water. The sulphite mixture was dissolved in water (100 ml) and added slowly: the addition period of sulphite solution lasted for 1 hour. The reaction time was altogether 1½ hours; the initial pH was 2.2.

Table No. 2 shows the reduction of 3,5-dinitrobenzoic acid with $Na_2SO_3$ and $Na_2S_2O_5$ in suspension. The sulphite mixtures were each dissolved in 550 ml of water. 500 ml of water was added to 50 g dinitrobenzoic acid (suspension) in a 2 l round bottom flask, supplied with a lid, on a water bath at 70° – 75° C. The addition period of the sulphite mixtures was 3½ hours. The total time of reaction was 4 hours; the initial pH was 2.2.

Table No. 3 shows the preparation of 3-N-methylamino-5-nitrobenzoic acid. Reduction was effected similarly to that shown in Table No. 2. The reduction products were then methylated, the methylation being carried out with 4 eqv. DMS and 4 eqv. NaOH at a temperature of 15°–20° C. The experiments were performed in a round bottom flask and cooled in cold water (NB: In some of the tests slightly more than 4 eqv was used. The NaOH was used in the form of freshly prepared solution). In the Tables, DNB = 3,5-nitrobenzoic acid, N-S = 3-nitro-5-N-sulphaminobenzoic acid, ANB = 3-amino-5-nitrobenzoic acid, DMS = dimethyl sulphate, Susp. = suspended and diss. = dissolved; eqv. = equivalents; $x$ = compounds of which $R_f$ = ca.O. The compounds with $R_f$ = ca.O consist of 2–3 spots, and we presume that they are further reduced compounds of 3-nitro-5-sulphaminobenzoic acid.

TABLE NO. 1

| $Na_2SO_3$/ $Na_2S_2O_5$ | pH after reaction | Chromatogram after addition of ½ quantity | | | Chromatogram after addition of ⅔ quantity | | | Chromatogram after reaction | | | AMB |
|---|---|---|---|---|---|---|---|---|---|---|---|
| | | DNB (%) | N-S (%) | x (%) | DNB (%) | N-S (%) | x (%) | DNB (%) | N-S (%) | x (%) | |
| 6.5g/ 9.0g (1.1eqv/ 2.2eqv) | 3.6 | 70 | 20 | 10 | 50 | 45 | 5 | 10–15 | 75–80 | 5–10 | – |
| 18.0g 3.3eqv. ($Na_2SO_3$ only) | 11.4 | 80 | 20 | trace | 50 | 45 | 5 | 15 | 70 | 15 | – |
| 15.0g 3.3eqv. $Na_2S_2O_5$ only | 2.6 | 80 | 20 | trace | 60 | 35 | 5 | 20 | 70 | 10 | trace |
| 10.4g/ 6.7g (1.75eqv. 1.5eqv) | 3.6 | 75 | 20 | 5 | 60 | 35 | 5 | 10 | 80 | 10 | – |
| 10.4g/ 7.2g (1.75eqv 1.75eqv) | 3.5 | 70 | 25 | 5 | 50 | 40 | 10 | 10 | 75 | 15 | – |

TABLE NO. 2

| $Na_2SO_3$/ $Na_2S_2O_5$ | Added sulphite solution (eqv) | pH | DNB | Chromatogram | | | |
|---|---|---|---|---|---|---|---|
| | | | | DNB | N-S | x | ANB |
| 35.5 g/ 45 g (1.1 eqv/ 2.12 eqv) | 0.65 | 2.8 | susp. | decrease | incr. | trace | |
| | 1.3 | 2.8 | " | | | " | |
| | 2.0 | 2.7 | " | | | " | trace |
| | 2.6 | 2.6 | " | | | | |
| | 3.3 | 2.8 | diss. | 40 % | 50 % | 10 % | |
| | 3.6 | 2.8 | " | 30 % | 60 % | 10 % | |
| 65.0 g/ 22.5 g (2.2 eqv/ 1.1 eqv) | 0.65 | 3.0 | susp. | decrease | incr. | trace | |
| | 1.3 | 2.8 | " | | | " | |
| | 2.0 | 3.0 | " | | | " | trace |
| | 2.6 | 3.1 | diss. | 50 % | 45 % | 5 % | |
| | 3.3 | 3.3 | " | 25 % | 65 % | 10 % | |
| | 3.6 | 3.5 | " | 10 % | 80 % | 10–12% | |
| 98.0 g (3.3 eqv) | 0.65 | 3.3 | susp. | decrease | incr. | — | |
| | 1.3 | 3.2 | " | | | trace | |
| | 2.0 | 3.6 | diss. | 30 % | 60 % | 10 % | |
| | 2.6 | | | 15 % | 70 % | 15 % | — |
| | 3.3 | 10.8 | diss. | 5 % | 80 % | 15 % | |
| | 3.6 | 11.1 | " | 5 % | 75 % | 20 % | |

TABLE NO. 3

| | Chromatogram from reduction | | | Hydrolysis | | Precipitation | | Yield | | Chromatogram | |
|---|---|---|---|---|---|---|---|---|---|---|---|
| DNB (g) | DNB (%) | N–S (%) | x (%) | HCl (ml) and (eqv) | Temp °C: Time (hrs) | pH | Time (hrs) | Weight (g.) | % | DNB (%) | desired (%) product |
| 50 | 10 | 75 | 15 | 150 (7.6) | 70:1 | 3.5 | 20 | ca30 (*) | 65.0 | 2–3 | 97–98 |
| 50 | 15 | 70 | 15 | 125 (6.4) | 70:1 | 3.3 | 20 | ca31.5 (*) | 68.0 | 2–3 | 97–98 |
| 50 | 30 | 60 | 10 | 125 (6.4) | 20:2 | 3.5 | 20 | ca19.0 (*) | 42.4 | 5 | 95 |
| 50 | 10 | 60 | 10 | 125 (6.4) | 20:2 | 3.3 | 20 | ca27.4 (*) | 59.3 | trace | 99 |
| 200 | 5 | 70 | 25 | 400 (5.1) | 20:½ | 3.2 | 20 | 112.0 (+) | 60.5 | 5 | 60.5 |
| 150 | 10 | 75 | 15 | 250 (4.2) | 20:2 | 2.7 | 20 | 97.5 | 70.5 | 5–7 | 93–95 |
| 150 | 10 | 70 | 20 | 250 (4.2) | 20:20 | 2.5 | 20 | 86 | | 5 | 95 |

(*) treated with charcoal;
(+) incomplete.

I claim:

1. A compound selected from the group consisting of a compound of the general formula:

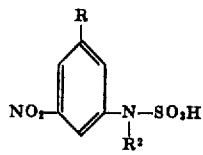

wherein:
- R is a carboxyl group or an alkoxy carbonyl group wherein the alkoxy group contains one to five carbon atoms;
- $R^2$ is hydrogen, alkyl having from one to five carbon atoms, alkyl having from one to five carbon atoms substituted by hydroxy, carboxyl, alkoxy carbonyl having one to five carbon atoms in the alkoxy group, and ether groups having one to five carbon atoms; and the mono-alkali metal, alkaline earth metal and ammonia salts when R is alkoxy carbonyl, and the di-alkali metal, alkaline earth metal, and ammonia salts when R is a carboxyl group.

2. A compound is claimed in claim 1 in which R is a methoxy- or ethoxy-carbonyl group.

3. A compound as claimed in claim 1 in which $R^2$ is a β-hydroxyethyl group.

4. A compound as claimed in claim 1 being selected from the group consisting of 3-nitro 3-N-methyl-sulphaminobenzoic acid, 3-nitro-5-N-propyl-sulphaminobenzoic acid, 3-nitro-5-N-(β-hydroxyethyl) sulphaminobenzoic acid and their di-alkali metal, alkaline earth metal, and ammonia salts.

5. The compound of claim 1 which is sodium 3-nitro-5-ethoxycarbonyl phenyl sulphamate.

* * * * *